No. 791,707. PATENTED JUNE 6, 1905.
A. B. LOVETT.
BEET HARVESTER.
APPLICATION FILED SEPT. 29, 1904.

Witnesses
Edward R. Monroe
Georgiana Chase

Inventor
Albert B. Lovett
By Luther V. Moulton
Attorney

No. 791,707. Patented June 6, 1905.

UNITED STATES PATENT OFFICE.

ALBERT B. LOVETT, OF BEULAH, MICHIGAN.

BEET-HARVESTER.

SPECIFICATION forming part of Letters Patent No. 791,707, dated June 6, 1905.

Application filed September 29, 1904. Serial No. 226,905.

*To all whom it may concern:*

Be it known that I, ALBERT B. LOVETT, a citizen of the United States, residing at Beulah, in the county of Benzie and State of Michigan, have invented certain new and useful Improvements in Beet-Harvesters; and I do hereby declare the following to be a full, clear, and exact description of the invention, such as will enable others skilled in the art to which it appertains to make and use the same.

My invention relates to improvements in beet-harvesters; and its object is to provide improved means whereby beets and other like vegetables may be removed from the soil and deposited upon a suitable conveyer or on the surface of the soil and to provide the same with certain new and useful features hereinafter more fully described, and particularly pointed out in the claims.

It consists of the combination and arrangement of devices, as will hereinafter appear by reference to the accompanying drawings, in which—

Figure 1:
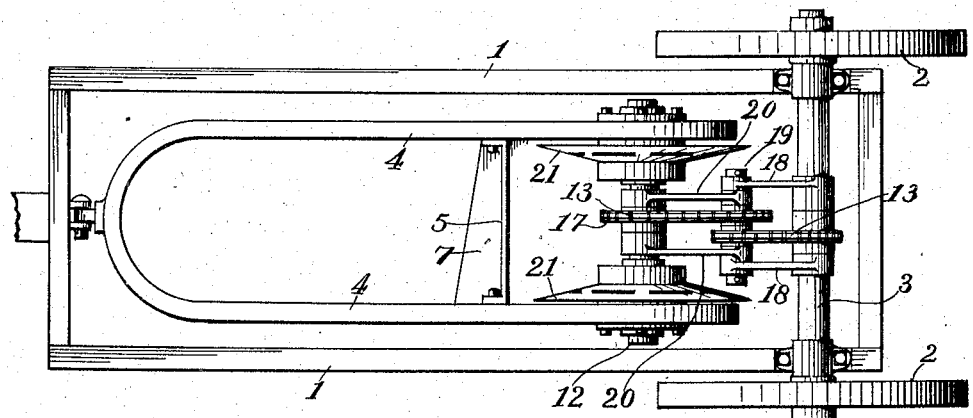
Figure 2:
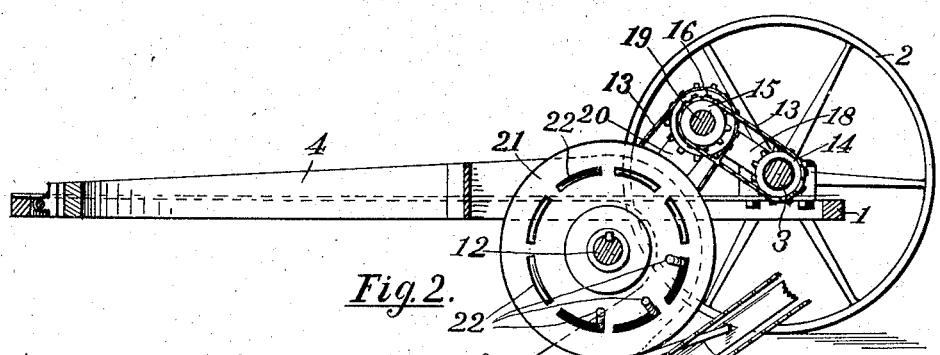
Figures 3, 4, 5, 6:
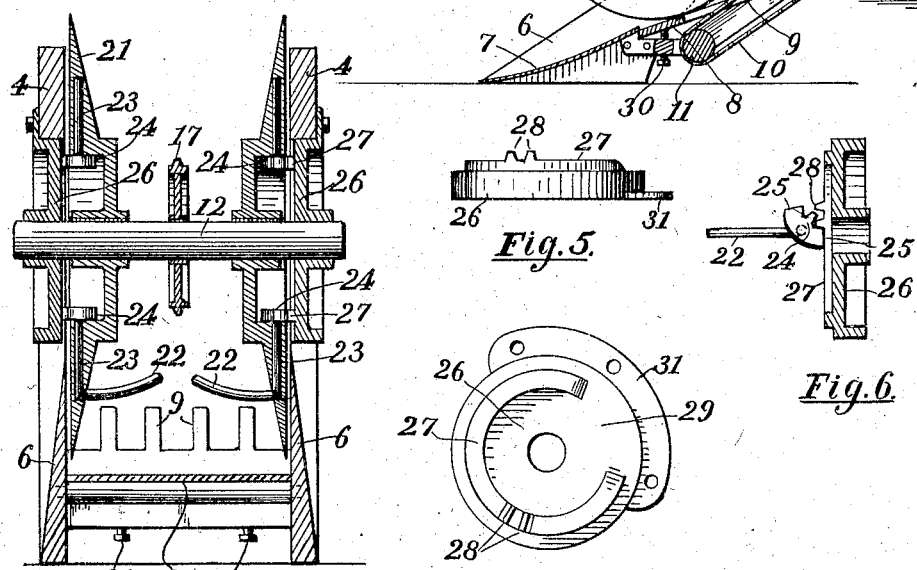

Figure 1 is a plan view of a device embodying my invention; Fig. 2, a central vertical section of the same; Fig. 3, an enlarged detail in vertical section; Fig. 4, a detail in elevation of one of the cam-plates; Fig. 5, a plan view of the same; and Fig. 6 a detail of the cam-plate in horizontal section, together with one of the lifting-fingers.

Like numerals refer to like parts in all of the figures.

1 represents any suitable frame supported upon a pair of wheels 2, connected to a transverse shaft 3, from which shaft motion is taken to operate the various rotating parts. 4 represents a U-shaped double beam connected at the forward end to the frame 1 and extending rearward in parallel planes and thence downward and forward in a curve, terminating in suitable cutting forward edges or colters 6, adapted to sever the soil at each side of the row of beets. Between these points is supported a suitable plowshare 7, adapted to pass beneath the beets and raise the same upward, together with the soil surrounding them.

8 is a transverse plate at the rear of the share 7, pivoted at its forward side and adjustable at the rear by means of suitable screws 30. Projecting rearward from this plate are a series of fingers 9, spaced apart and between which the chains of a suitable carrier or elevator 10 extend, said chains being engaged with a suitable transverse roll 11 beneath the plate 8. This elevator is operated by any suitable means (not shown) and constitutes no necessary part of my invention.

Above the share 7 is a transverse shaft 12, rotated by suitable sprocket-chains 13 13, engaging suitable sprocket-wheels 14, 15, 16, and 17. The wheel 14 is fixed on the shaft 3, the wheel 17 on the shaft 12, and the two wheels 15 and 16 on a counter-shaft 19, movably supported upon the adjacent ends of suitable arms 18 and 20, pivotally connected by said shaft, the arms 18 being journaled on the shaft 3 and the arms 20 on the shaft 12, whereby the motion is transmitted from the shaft 3 to the shaft 12, and the latter shaft permitted to rise and fall, as occasion may require.

On the shaft 12 and adjacent to the colters 6 are suitable disks 21, having sharp or beveled edges arranged to rotate close to the colters 6 and provided with suitable radial recesses in which are mounted suitable rock-shafts 23, projecting from the outer ends of which shafts are segmental lifting-fingers 22, which are adapted to swing outward perpendicular to the plane of the disks and to turn within recesses in the disks as the rock-shafts 23 turn about their respective axes. On the inner end of each rock-shaft is a fractional pinion 24, having shoulders 25 at substantially right angles to each other and adapted to engage and traverse suitable fixed cam-surfaces 27 on the cam-plates 26, attached to the beams 4 and provided with teeth 28 to engage the fractional pinion and turn the rock-shafts so that the fingers 22 will project outward from the disk. The cam-surface 27 is broken away throughout a portion of the circumference, as at 29 in Fig. 4, and the cam-plate is provided with a suitable flange 31, by means of which it is secured to the beams 4. The beams 4 are also provided with a cross-stay 5, to which is attached any suitable elevating mechanism, (not shown,) by means of which the operative portion of the device may be lifted clear of the soil when not in operation.

When in operation, the beams 4 are lowered sufficiently to permit the share 7 to enter the soil and run beneath the row of beets to be harvested. The colters 6 sever the soil at each side of the row, and the share 7 raises the soil and loosens the same. The disks 21 are rotated by means of the sprocket-chains 13, and the cam-surfaces 27 being stationary the pinions 24 will traverse the same as the disks rotate. When the pinions are opposite the broken-away part of the cam-surface 27, the weight of the fingers 22 will turn them within the respective recesses in the disk, and when turned to this position one of the shoulders 25 will engage with the cam-surface 27 and retain the lifting-finger within the recess. As the teeth 28 engage the teeth of the fractional pinion 24 the shaft 23 will be rotated about its axis until the other shoulder 25 reaches the surface of the cam-plate 27 and the finger 22 projects outward from the disk. This movement occurs as the fingers 22 are opposite the beets. These fingers thus break up the soil and engaging the beets carry them upward and rearward, extracting them from the soil and discharging them upon the fingers 9. The pulverized soil will pass downward between the fingers 9 and the chains 10, and the beets will be carried away by the conveyer and deposited in any suitable receptacle or upon the surface of the soil.

Having thus fully described my invention, what I claim, and desire to secure by Letters Patent, is—

1. In a beet-harvester, the combination of an inclined share to run under the beats and soil and raise the same, a rotative disk at each side of the share, fingers pivoted to the disks and adapted to engage the beets, means for projecting the fingers from the disks, and means for rotating the disks.

2. In a beet-harvester, an inclined share adapted to run under the beets and soil and raise the same, a colter at each side of the share, a rotative disk near each colter and having a sharp beveled edge, fingers pivoted to the disks and adapted to project therefrom, means for rotating the disks, and means for projecting the fingers from the disks when the fingers are opposite the share.

3. In a beet-harvester, an inclined share, a pivoted plate at the rear of the share, means for adjusting the inclination of the plate, fingers projecting rearward from the plate, a rotative disk at each side of the share and having a sharp edge, fingers pivoted to the disks, means for projecting the fingers from the disks when opposite the share, and means for rotating the disks.

4. In a beet-harvester, the combination of an inclined share, a rotary disk at each side of the share, radial rock-shafts journaled in the disks, fingers on the outer ends of the rock-shafts, means for turning the shafts about their axes to project the fingers from the disks, and means for rotating the disks.

5. In a beet-harvester, the combination of an inclined share, a colter at each side of the share, a disk near each colter and having a beveled edge, segmental recesses in the disks, fingers in the recesses and adapted to turn outward therefrom, radial shafts supporting the fingers, fractional pinions on the shafts and having shoulders, cam-plates having fixed cam-surfaces to engage the shoulders and teeth to engage the pinions, and means for rotating the disks.

6. In a beet-harvester, a double beam having colters attached, a share extending between the colters, cam-plates attached to the beams and having cam-surfaces and teeth, a shaft journaled in the cam-plates, disks mounted on the shaft and having beveled edges adjacent to the colters, radial shafts journaled in the disks, fractional pinions on the inner ends of the shafts and engaged by the teeth on the cam-plates, fingers on the shafts, and means for rotating the shaft on which the disks are mounted.

7. In a beet-harvester, parallel beams spaced apart and vertically adjustable, colters on the beams, an inclined share attached to the colters, a pivoted plate at the rear of the share, fingers on the rear of the plate, means for adjusting the plate, elevator-chains extending between the fingers, cam-plates attached to the beams and having cam-surfaces and teeth, a shaft journaled in the cam-plates, disks mounted on the shaft and having beveled edges near the colters, radial shafts journaled in the disks, fingers on the outer ends of the shafts, fractional pinions on the inner ends of the shafts and having shoulders to engage the cam-surfaces, and means for rotating the shaft on which the disks are mounted.

In testimony whereof I affix my signature in presence of two witnesses.

ALBERT B. LOVETT.

Witnesses:
E. B. NEFF,
F. L. ORCUTT.